United States Patent [19]

Sakata

[11] Patent Number: 5,537,595
[45] Date of Patent: Jul. 16, 1996

[54] DEVICE MANAGEMENT SYSTEM IN A COMPUTER SYSTEM

[75] Inventor: Akinori Sakata, Kawasaki, Japan

[73] Assignee: Fujitsu Limited, Kanagawa, Japan

[21] Appl. No.: 409,943

[22] Filed: Mar. 23, 1995

Related U.S. Application Data

[63] Continuation of Ser. No. 987,684, Dec. 9, 1992, abandoned.

[30] Foreign Application Priority Data

Dec. 11, 1991 [JP] Japan ................................. 3-326266

[51] Int. Cl.⁶ .................................................. G06F 12/06
[52] U.S. Cl. ............... 395/650; 364/246.11; 364/246.12; 364/246.13; 395/478
[58] Field of Search ................................. 395/650, 600, 395/775, 425, 478; 364/246.11

[56] References Cited

U.S. PATENT DOCUMENTS

| | | | |
|---|---|---|---|
| 4,916,603 | 4/1990 | Ryan et al. | 364/DIG. 1 |
| 4,967,353 | 10/1990 | Brenner et al. | 364/DIG. 1 |
| 5,193,172 | 3/1993 | Arai et al. | 395/425 |
| 5,247,687 | 9/1993 | Eilert et al. | 395/775 |
| 5,321,834 | 6/1994 | Weiser et al. | 395/600 |

FOREIGN PATENT DOCUMENTS 0280019  8/1988  European Pat. Off. .

OTHER PUBLICATIONS

Takayasu Miki, et al. 131, Document Retrieving Device, Date Filed: Jun. 22, 1984, Patent ABS of Japan, Appl. No.: 59–129812, ABS GRP No.: P463, ABS Pub Date: Jun. 4, 1986.

R. F. Arnold, et al., "Adaptive Time Stamp Mechanism", *IBM Technical Disclosure Bulletin*, vol. 16, No. 7, Dec. 1973, pp. 2209–2213.

P. R. Hoffman, et al., "Page Replacement Algorithm", *IBM Technical Disclosure Bulletin*, vol. 16, No. 8, Jan. 1974, p. 2734.

N. K. Ouchi, "Long Cycle Adaptive Time Stamp Mechanism", *IBM Technical Disclosure Bulletin*, vol. 17, No. 2, Jul. 1974, pp. 528–530.

*Primary Examiner*—Kevin A. Kriess
*Assistant Examiner*—Majid A. Banankhah
*Attorney, Agent, or Firm*—Staas & Halsey

[57] ABSTRACT

A device management system in a computer system comprising a unit for measuring a load condition of a device such as a real memory to be managed. A unit is also included for determining a management period such as an update period of a real page in a real memory in accordance with the load condition, such as an unreference interval count (UIC) of the real page. The management period is determined such that, the larger the value of the load condition is, the shorter the management period, or the larger the UIC of the real is, the longer the update period. Since the management period is changed in accordance with the load condition of the device to be managed, management of devices is thereby accomplished with a lesser Central Processing Unit (CPU) time. Additionally, the device management system updates a time value for which a real page has not been referenced.

9 Claims, 14 Drawing Sheets

Fig. 5B

| UIC = 0<br>NO ACCESS | UIC = 3<br>NO ACCESS | UIC = 5<br>ACCESSED |
|---|---|---|
| UIC = 1<br>ACCESSED | UIC = 34<br>NO ACCESS | UIC = 2<br>ACCESSED |
| UIC = 20<br>ACCESSED | UIC = 12<br>NO ACCESS | UIC = 9<br>ACCESSED |

Fig. 5C

| UIC = 1 | UIC = 0 | UIC = 0 |
|---|---|---|
| UIC = 0 | UIC = 35 | UIC = 0 |
| UIC = 0 | UIC = 13 | UIC = 0 |

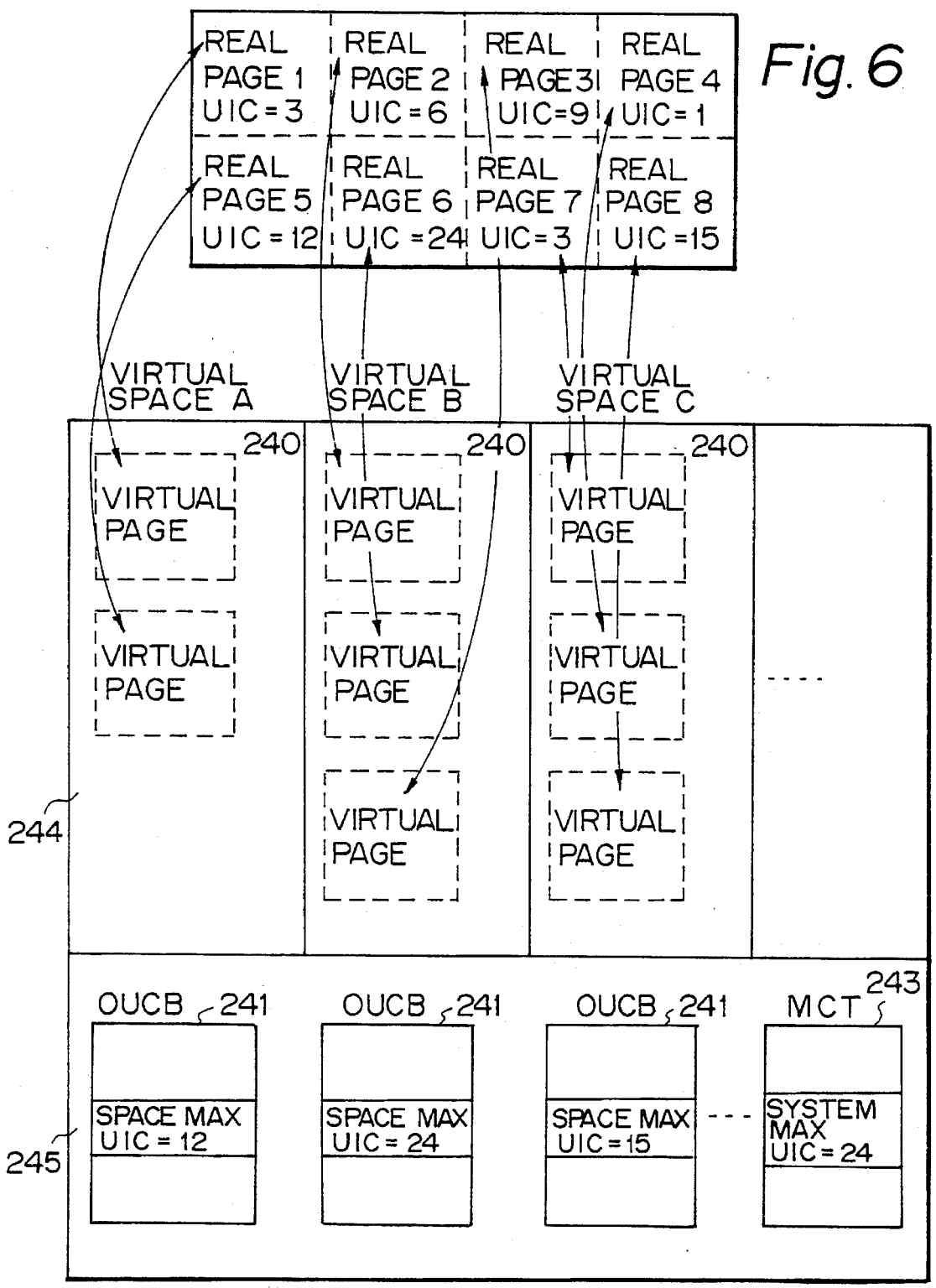

Fig. 7

OUCB AND MCT

| | SPACE MAX UIC SYSTEM MAX UIC | REAL STORAGE PRIORITY | SPACE REFERENCE UIC SYSTEM REFERENCE UIC |
|---|---|---|---|
| VIRTUAL SPACE A | 12 | 6 | 2 |
| VIRTUAL SPACE B | 24 | 3 | 8 |
| VIRTUAL SPACE C | 15 | 1 | 15 |
| SYSTEM | 24 | — | 15 |

DEVICE MANAGEMENT SYSTEM IN A COMPUTER SYSTEM

This application is a continuation of application Ser. No. 07/987,684, filed Dec. 9, 1992, now abandoned.

BACKGROUND OF THE INVENTION

1. Field of the Invention

The present invention relates to a device management system in a computer system for managing or supervising devices which constitute a computer system, and in particular, to a memory management system in a computer system for updating elapsed time values for unreferenced real pages in a real memory. The elapsed time values are hereinafter referred to as unreferenced interval counts (UIC). In more detail, the present invention relates to a device management system such as a memory management system in a computer system for realizing the management and updating processes with a minimum CPU use time.

For example, by updating unreferenced interval counts for unreferenced real pages of a real memory in a computer system, an operating system may periodically supervise a device such as an input/output unit, a system storage unit, or a main memory, which constitutes the computer system. The execution of such management processing monopolizes the use of a CPU so that operation time available for a problem program for executing a data processing is decreased. Therefore, it is necessary to provide a construction in which the management processing is executed by using as little CPU time as possible.

2. Description of the Related Art

In the prior art, in a computer system, the management of devices which constitute a computer system is executed in a constant time period regardless of the load condition of the device to be managed.

For example, in a computer system, the unreferenced interval counts for unreferenced real pages in the real memory are supervised so that the real page having the longest unreferenced interval count is paged out to an external storage unit. In the prior art, the supervision of these unreferenced interval counts is carried out by checking whether or not each real page has been accessed since the last supervising cycle, and if the real page has been accessed, its unreferenced interval count is reset to zero, and if the real page has not been accessed, the elapsed time since the last supervising cycle is accumulated in the unreferenced interval count.

Essentially, when the load condition of the device to be managed is an overload condition, the operating condition of the device has a high probability of being changed within a short time, and therefore, the supervision of the device must be carried out frequently. Whereas when the load is not heavy, the operating condition of the device to be managed has a high probability of not being changed within a short time, and therefore, it is not necessary to supervise the device so frequently.

For example, an explanation is given for a case in which the device to be managed is a real memory. In this case, the unreferenced interval count of each real page in the real memory is supervised. Namely, when the frequency of accessing the real pages is high, the real page representing the longest unreferenced interval count cannot be determined accurately unless the unreferenced interval count is supervised with a short time period of, for example, one second. Whereas, when the accessing frequency to the real pages is low, the real page representing the longest unreferenced interval count can be determined accurately even when the unreferenced interval count is supervised with a long period of time, for example, ten seconds.

In the prior art, however, the supervision of the device to be managed is carried out with a constant time period regardless of the load condition of the device. Therefore, when the load of the device to be managed is not heavy, a management program for carrying out a management processing runs more than necessary. Also, while the management program is running, processor interrupt is inhibited. In a multiprocessor system, however, a serialization of the processors is necessary. Accordingly, running the management program more than necessary decreases the available time to run programs and causes excess queuing of programs being run by the serialized processors for a relatively long time.

SUMMARY OF THE INVENTION

The present invention is made in view of the above problems, and has as an object to provide a new device management system in a computer system which can realize the management of devices to be managed with less CPU time by changing the time period of the management in accordance with the load of the device to be managed, and to provide a new memory management system in a computer system which can update, within a short CPU time, a time value for which a real page has not been referenced.

To attain the above object, there is provided, according to the present invention, a device management system in a computer system for managing devices which constitute the computer system. The device management system comprises a load measuring unit for measuring a value of a load condition of a device to be managed, a management period determining unit for determining, in accordance with the value of the load condition measured by the load measuring unit, a management period in such a way that, the larger the value of the load condition, the shorter the management period, and the smaller the value of the load condition, the longer the management period; and a managing unit for executing a management processing of the device to be managed in accordance with the management period determined by the management period determining unit.

According to an aspect of the present invention, the device to be managed has a plurality of mechanisms to be managed, and the managing unit comprises a management period distributing unit for distributing, within the management period determined by the management period determining unit, the availability for processing of the plurality of mechanisms.

According to another aspect of the present invention, in the above system, the managing unit further comprises a management period changing unit for sequentially changing the management period determined by the management period determining unit so as to provide provisional management periods. The provisional management period changes from the management period in the last management cycle to the management period in the current management cycle step by step.

According to still another aspect of the present invention, the device to be managed is a real memory for storing a plurality of real pages.

In the above system, the device management system is a memory management system for updating an unreferenced interval count of each real page in a real memory. In this system the management period determining unit comprises: a determining unit for determining a UIC update period in response to a system reference UIC which is equal to the value of the maximum space reference UIC, each of the space reference UICs being derived from the space maximum UIC among the UICs of real pages allocated to a virtual space and a real storage priority given to the virtual space, the UIC update period being determined in such a way that the larger the system UIC is, the longer the specified UIC update period, and the shorter the system UIC is, the shorter the specified UIC update period; a judging unit, operatively connected to the determining unit, for judging whether or not the UIC of each real page allocated to a virtual space reaches the UIC update period; and an updating unit, operatively connected to the judging unit, for updating the UIC of the real page allocated to the virtual space by adding the update period to the UIC when the UIC of a real page allocated to a virtual space reaches the UIC update period and when the real page has not been accessed since the last update period, and for resetting the UIC of the real page allocated to the virtual space to zero when the UIC of a real page allocated to a virtual space reaches the UIC update period and when the real page has been accessed since the last update period.

According to an aspect of the present invention, the system further comprises interval counter managing units for storing the UICs of the real pages allocated to the virtual spaces.

In the above system, the space reference UIC of each virtual space is obtained by dividing the space maximum UIC of the virtual space by the real storage priority given to the virtual space.

Additionally, in the above system, the UIC update period is determined by multiplying the system reference UIC by a requested accuracy of a UIC of a real page.

Further, in the above system, the updating unit comprises an update period dispersing unit for distributing, within the update period determined by the determining unit, the chances for update processing.

Moreover, the updating unit further comprises an update period changing unit for sequentially changing the update period determined by the determining unit so as to provide a provisional update period, the provisional update period changing from the update period in the last update cycle to the update period in the current update cycle step by step.

BRIEF DESCRIPTION OF THE DRAWINGS

The above object and features of the present invention will be more apparent from the following description of the preferred embodiments with reference to the drawings, wherein:

FIG. 5B is a diagram explaining the change of contents of PFTEs in an embodiment of the present invention;

FIG. 5C is a diagram explaining the change of contents of PFTEs in an embodiment of the present invention;

FIG. 6 is a diagram explaining management data in a corresponding relationship between a real page and a virtual space in an embodiment of the present invention;

FIG. 7 is a diagram explaining management data in a Systems Decision Manager Control Black OUCB and A Memory Control Black (MCT) in an embodiment of the present invention;

DESCRIPTION OF THE PREFERRED EMBODIMENTS

Figure 1:
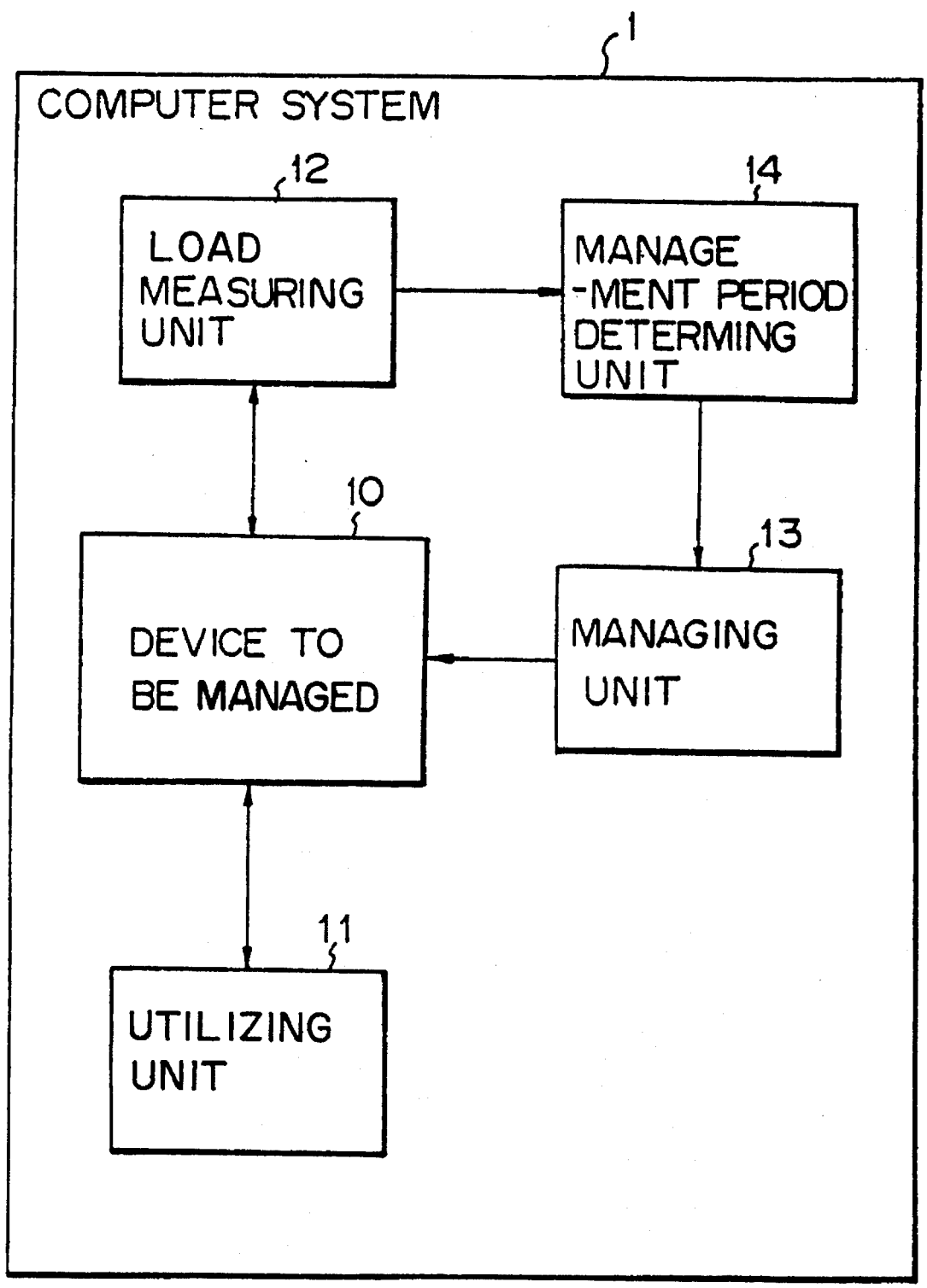
FIG. 1 is a principal construction diagram of an aspect of the present invention.

FIG. 1 shows a principal construction of a device management system in a computer system according to the present invention.

In FIG. 1, 1 is the computer system relating to the present invention. The computer system 1 comprises device 10 to be managed (or selected device), a utilizing unit 11, a load measuring unit 12, a managing unit 13, and a management period determining unit 14. Here, these units are constructed by hardware and programs, or constructed by programs only.

The device 10 to be managed is the object of management. The utilizing unit 11 utilizes the device 10 to be managed. The load measuring unit 12 measures the load condition value of the device 10 to be managed and utilized by the utilizing unit 11. The managing unit 13 manages the device 10 to be managed. The management period determining unit 14 determines the period of the management executed by the managing unit 13.

In the device management system in a computer system relating to the present invention, the management period determining unit 14 determines, in accordance with the value of the load condition measured by the load measuring unit 12, a management period value which is a short management period value when a large load condition is present, and a long management period value when a small load condition is present. The managing unit 13 executes, in response to the determination of the management period value, a management processing of the device 10 to be managed in accordance with a short management period when the load of the device 10 to be managed is heavy, and executes a management processing of the device 10 to be managed in accordance with a long management period when the load of the device 10 to be managed is small.

Thus, when the load of the device 10 to be managed is light, it is not necessary to execute the management processing as often so that the management processing by the managing unit 13 is executed in accordance with the long period. By this construction, the unnecessary activation of the managing unit 13 does not occur and the management of the device 10 to be managed can be realized with little CPU time.

When the managing unit 13 executes a management processing of the device 10 to be managed in accordance with the management period determined by the management period determining unit 14, and when the device 10 to be managed has a plurality of mechanisms, e.g.; virtual spaces to be managed, the management processing of the unit to be managed may be executed by dispersing the availability of management processing of the mechanism to be managed within the time of the management period. In this way, the concentration of the CPU use for a particular mechanisme in the device 10 can be prevented.

When the dispersion is executed, the managing unit 13 may not immediately use the management period determined by the management period determining unit 14, but may use tentative management period values determined by sequentially changing from the management period set at that time to the management period value determined by the management period determining unit 14. In this way, a disadvantageous effect on the management processing caused by a sudden management period change can be prevented.

Figure 2:
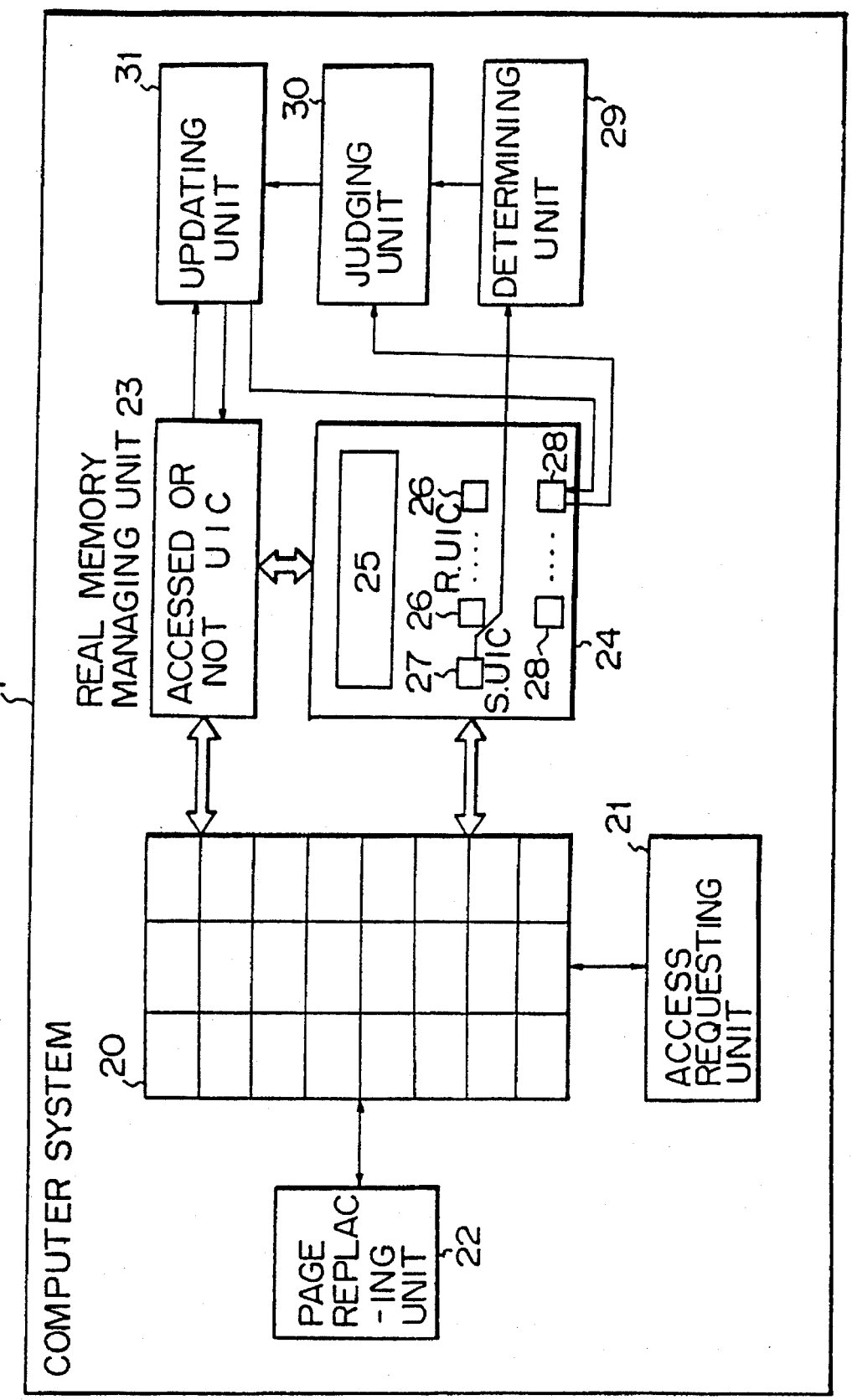
FIG. 2 is a principal construction diagram of another aspect of the present invention.

FIG. 2 shows a principal construction of a memory management system in a computer system according to the present invention.

In FIG. 2, 1 is a computer system relating to the present invention. The computer system comprises a real memory 20 which constitutes a main storage unit, an access requesting unit 21, a page replacing unit 22, a real memory managing unit 23, a virtual space managing unit 24, a determining unit 29, a judging unit 30, and an updating unit 31.

The real memory 20 stores memory data of real pages loaded from a not-shown external storage unit. The access requesting unit 21 executes an access to a real page in the real memory 20. The page replacing unit 22 pages out, when a request to replace a real page by another real page is given, memory data of a real page having the longest unreferenced interval count representing the longest elapsed time value for which the real page has not been referred, and loads new memory data of a new real page from the external storage unit.

The real memory managing unit 23 supervises the real memory 20 to check whether or not each real page has been accessed, and accumulates the unreferenced interval count of each page that has not been accessed.

The virtual space managing unit 24 is comprised by a page relationship managing unit 25, reference UIC managing units (R. UIC) 26 provided to correspond to the respective virtual spaces, a maximum UIC managing unit (S. UIC) 27, and interval counter managing units 28 provided to correspond to the respective virtual spaces.

The page relationship managing unit 25 manages the relationship between the real pages provided in the real memory 20 and virtual pages in virtual spaces. Each of the reference UIC managing units 26 manages a reference value obtained from the maximum value of the unreferenced interval counts of the real pages in the corresponding virtual space and a real memory priority given to the corresponding virtual space. The maximum UIC managing unit 27 manages the maximum reference value of the reference values managed by the reference UIC managing unit 26. Each of the interval counter managing units 28 manages the unreferenced interval count of the real pages in the real memory 20 corresponding to the corresponding virtual space.

The determining unit 29 determines, in accordance with the maximum value managed by the maximum evaluation value managing means 27, the update period which is used by the updating unit 31. The judging unit 30 judges, in accordance with a predetermined judgement executing period, whether or not the management values, i.e., the unreferenced interval counts, of the respective interval counter managing units 28 are larger than the update period value determined by the determining unit 29. The updating unit 31 executes an update or reset process of the unreferenced interval counts managed by the real memory managing unit 23, and executes a reset process of the management values in the interval counter managing units 28.

In the memory management system shown in FIG. 2, since the maximum reference value of the unreferenced interval counts managed by the maximum count managing means 27 represents the load condition of the real memory 20, the determining unit 29 specifies, in accordance with the maximum value, a long update period when the maximum value is large, and a short update period when the maximum value is small. Then, the judging unit 30 judges, after receiving the decision on the update period, and in accordance with the predetermined judgement executing period, whether or not the management value in each of the interval counter managing units 28 is larger than the update period determined by the determining unit 29, so as to judge whether or not it reaches the update time of the unreferenced interval count managed by the real memory managing unit 23.

If it is judged by the judging unit 30 that the time reaches the update time, the updating unit 31 updates the unreferenced interval counts of the real pages in the virtual spaces corresponding to the interval counter managing units 28, and of the real pages which have not been accessed since the last updating time, by the interval counts in the interval counter managing units 28. On the other hand, the unreferenced interval counts of the real pages which have been accessed are reset to zero and the interval counts in the interval managing units 28 are reset to zero.

In this way, when the load of the real memory 20 is light, a real page to be replaced by the page replacing unit 22 can be accurately determined even if the unreferenced interval count is not updated so frequently, and in addition, the updating process by the update unit 31 is executed with a long period. Thus, the update unit 31 is not unnecessarily activated so that the update of the unreferenced interval counts which are managed by the real memory managing unit 23 can be effected with a short CPU time.

In the execution of the update process of the unreferenced interval counts in accordance with the update period determined by the determining unit 29, as an alternative to executing the update process at one time when the judging unit 30 judges that the update time is reached, the process execution may be distributed by the updating unit 31, from that time point and within the update period determined by the determining unit 29. In this way, concentrated use of the CPU while the unreferenced interval counts are being updated can be prevented.

As an alternative to immediately using the update period determined by the determining unit 29, the updating unit 31 may use provisional update periods which are determined by sequentially changing the judged executing periods from the update period set at that time to the update period determined by the determining unit 29, and when the provisional update periods are used, the next provisional period is not used until the set provisional period is over. In this way, inefficient update processing due to rapid changes in the update period can be prevented.

In the following, embodiments of the present invention will be described in detail in which the device to be managed is a real memory and the update period is changed in accordance with the unreferenced interval counts of real pages in the real memory. Note that, as explained in FIG. 2, the unreferenced interval count is an accumulated value of the time during which the real page has not been accessed, and is generally referred to as an UIC (Unreferenced Interval Count).

Figure 3:
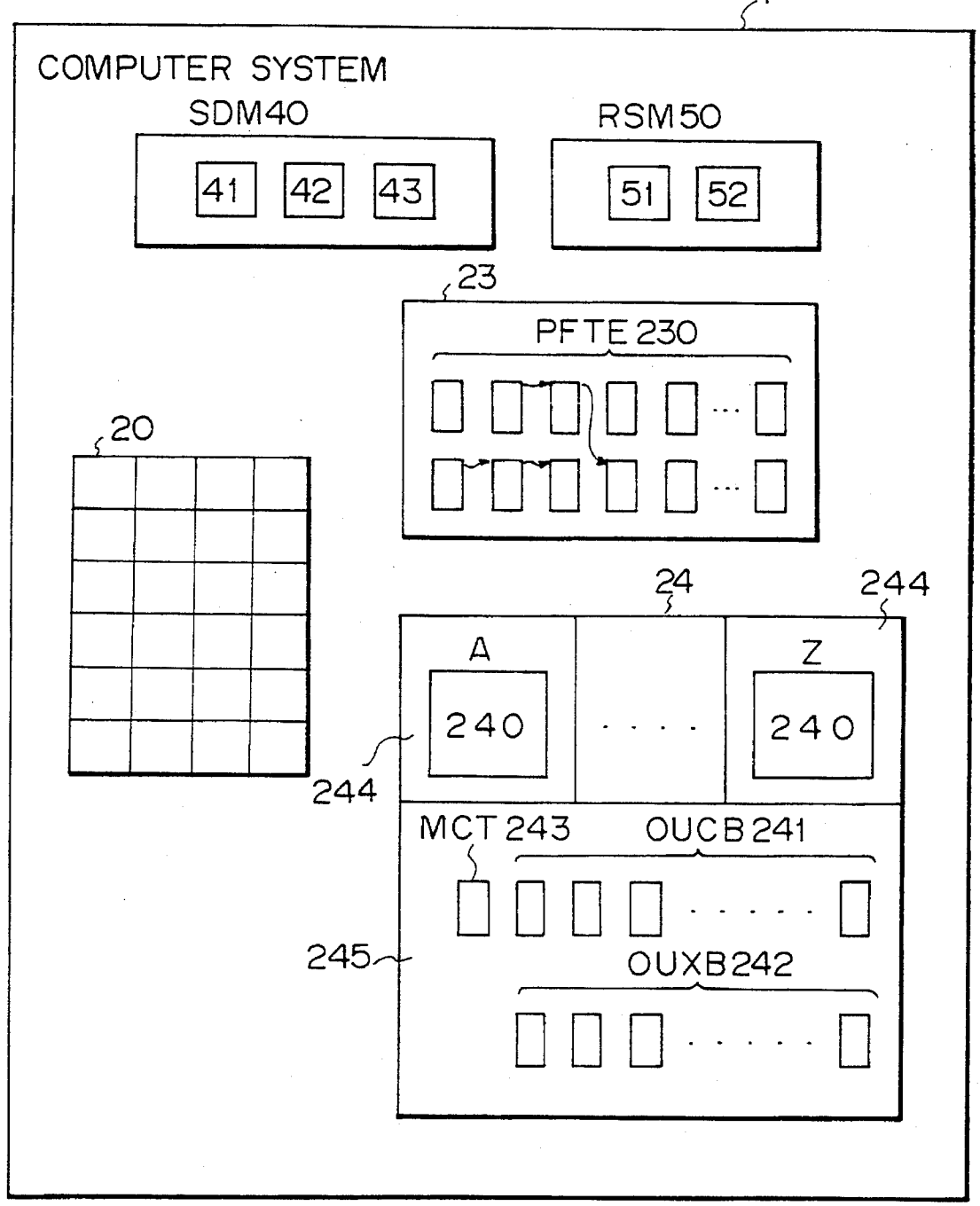
FIG. 3 is a block diagram showing an embodiment of the present invention.
Figure 4:
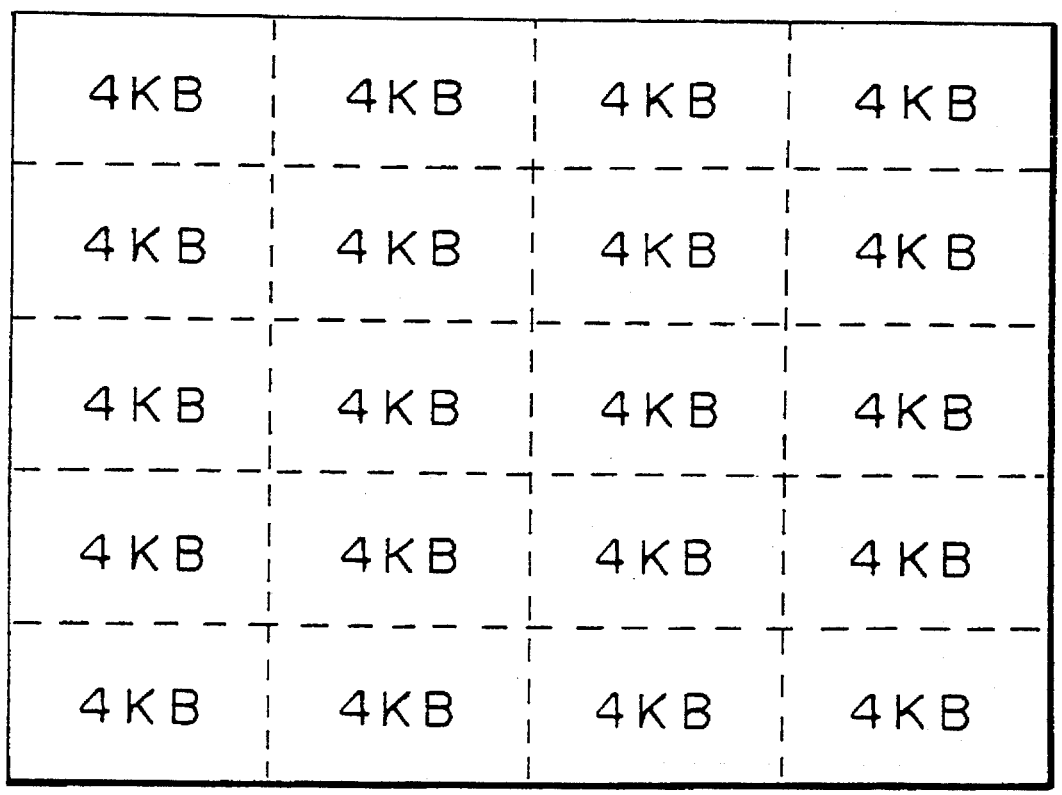
FIG. 4 is a diagram for explaining the construction of pages in a real memory in an embodiment of the present invention.

FIG. 3 shows an example of the construction of the embodiment. In the figure, 20 is the real memory which is shown in FIG. 2. The real memory 20 is divided into pages each having a capacity of, for example, 4K bytes, as shown in FIG. 4. Memory data in each page is handled as a unit to be replaced by memory data in a not shown external storage unit.

Reference numeral 23 is the real memory managing unit shown in FIG. 2, 24 is the virtual space managing unit shown in FIG. 2, 40 is a system decision managing unit (SDM) provided in an operating system, and 50 is a real storage managing unit (RSM). The SDM 40 comprises an UIC update process issuing module 41, a replacement process issuing module 42, and an update period calculating module 43. The RSM 50 comprises an UIC process execution update module 51, and a replacement process issuing module 52.

Next, each of these units and modules is described in detail.

Figure 5A:
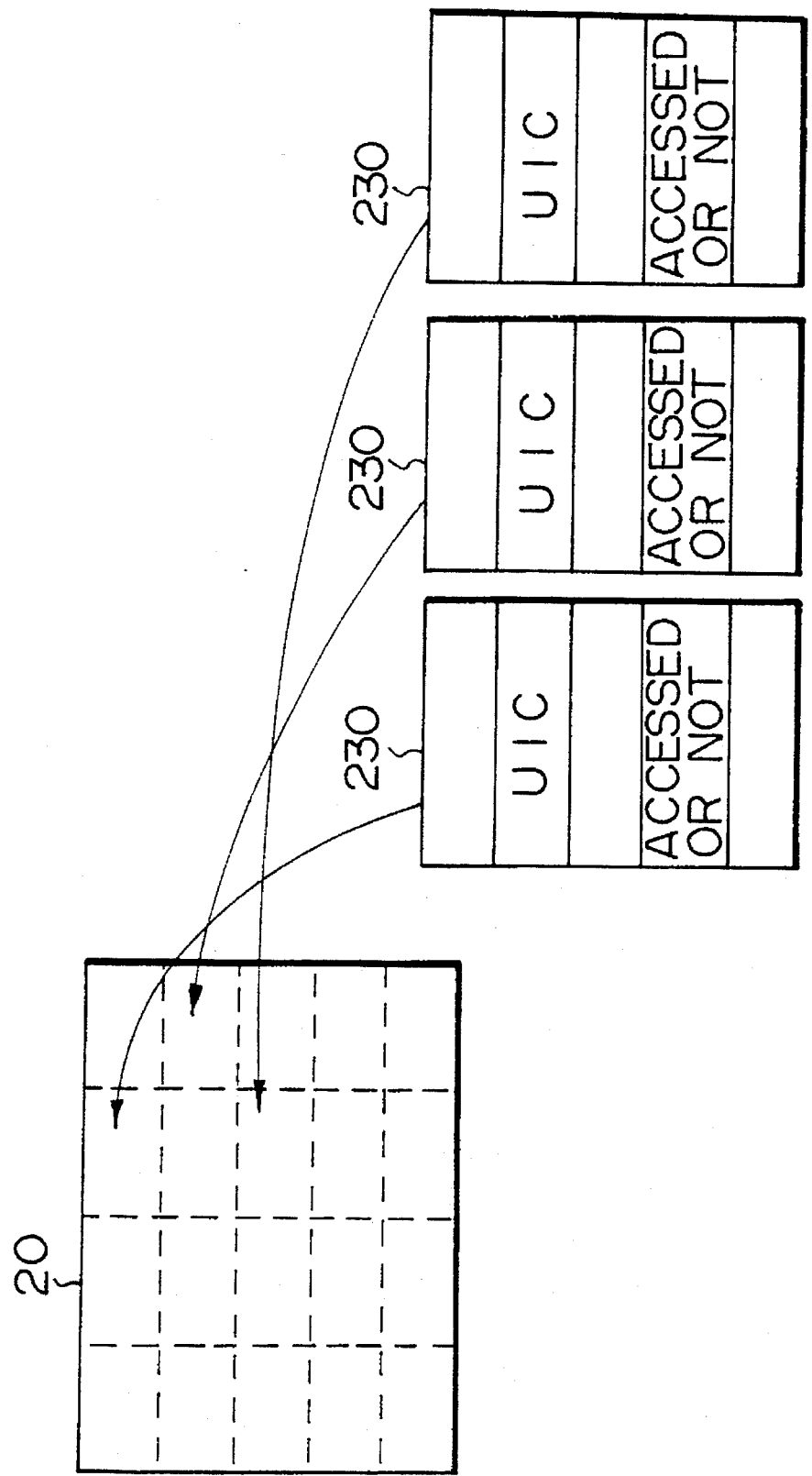
FIG. 5A is a diagram explaining management data in PFTEs in an embodiment of the present invention.

The real memory managing unit 23 consists of page frame table entries (PFTE) 230 provided to correspond to the real pages in the real memory 20 in a one to one correspondence. Each of these PFTEs 230 stores, as shown in FIG. 5A, the UIC of the corresponding real page and the information of whether or not the real page has been accessed since the last update cycle of the UIC. Here, in FIG. 5A, for the sake of simplicity of the drawing, only three PFTEs 230 corresponding to three real pages are illustrated. In practice, however, as shown in FIGS. 5B and 5C when the total number of the real pages of the real memory 20 is nine, the number of the PFTEs 230 is also nine. Each of the PFTEs 230 stores the UIC of the corresponding page and the information of whether or not the real page has been accessed since the last update cycle. When the real page has been accessed since the last update cycle, the UIC of the real page is reset to zero. When the real page has not been accessed, the UIC of the real page is increased by one which is the UIC update process activating period. Thus, the UIC=0 is updated to 1 when the real page has not been accessed; the UIC=3 is updated to 0 when the real page has been accessed; and so forth. Note that, at each update process activating period, the UICs of all real pages are not updated but only the UICs of the real pages allocated to a certain virtual space are updated.

The virtual space managing unit 24 consists of local areas 244 and a common space area 245.

In the space areas 244, page relationship managing units 240 are provided to correspond to the virtual spaces A to Z in a one to one correspondence. Each of the page relationship managing unit 240 manages the corresponding relationship between a virtual space and one or more real pages, allocated to the virtual space, in the real memory 20.

In the common area 245, system decision manager control blocks (OUCBs) 241 are provided to correspond to the virtual spaces in a one to one correspondence. Each of the OUCBs 241 manages the maximum value (hereinafter referred to as a space maximum UIC) in the UICs of the real pages corresponding to the virtual space, and space reference UICs each of which is determined by dividing the space maximum UIC by a real storage priority given to the corresponding virtual space.

The common area 245 further includes system decision manager extension control blocks (OUXBs) 242, provided to correspond to the virtual spaces in a one to one correspondence. Each of the OUXBs 242 manages an elapsed time from the last activation of the UIC update processing of the UIC of the real pages allocated to the corresponding virtual space. The elapsed time is referred to as an interval count.

The virtual space managing unit 24 further includes, in the common area 245, a memory control block (MCT) 243 for managing the maximum value (hereinafter referred to as a system maximum UIC) in the space maximum UICs managed by the OUCBs 241, and the maximum value (hereinafter referred to as a system reference UIC) in the space reference UICs managed by the OUCBs 241.

The page relationship managing units 240 explained here are the same as the page relationship managing unit 25 explained with reference to FIG. 2. The OUCBs 241 are the same as the evaluation value managing units 26 explained with reference to FIG. 2. The OUXBs 242 are the same as the interval counter managing units 28 explained with reference to FIG. 2. The MCT 243 is the same as the maximum evaluation value managing unit 27 explained with reference to FIG. 2.

FIG. 6 shows an example of the management data of the page relationship managing units 240. As shown in FIG. 6, the page relationship managing units 240 are provided to correspond to the virtual spaces. Each of the units 240 manages the corresponding relationships between the real pages in the real memory 20 and the virtual pages in the corresponding virtual space. In the illustrated example, real pages 1 and 5 are allocated to two virtual pages in the virtual space A; real pages 2, 6, and 3 are allocated to three virtual pages in the virtual pages in the virtual space B; and real pages 7, 4, and 8 are allocated to three virtual pages in the virtual space C. The space maximum UIC in the OUCB corresponding to the virtual space A is 12 because the maximum value of UICs, which are 3 and 12, in the real pages 1 and 5, is 12. The space maximum UIC in the OUCB corresponding to the virtual space B is 24 because that is the maximum value of the UICs, which are 6, 24 and 9, in the real pages 2, 6 and 3. The space maximum UIC in the OUCB corresponding to the virtual space C is 15 because the maximum value of the UICs, which are 7, 1 and 15, in the real pages 7, 4 and 8, is 15. The system maximum UIC is 24.

FIG. 7 shows an example of the management data in the OUTBs 241 and the MCT 243. As shown in FIG. 7, when the maximum value of the UICs of the real pages allocated to the virtual space A is "12 seconds", the space maximum UIC of the virtual space A is "12 seconds"; when the maximum value of the UICs of the real pages allocated to the virtual space B is "24 seconds", the space maximum UIC of the virtual space B is "24 seconds"; when the maximum value of the UICs of the real pages allocated to the virtual space C is "15 seconds", the space maximum UIC of the virtual space C is "15 seconds"; and when the virtual spaces are only these three, the system maximum UIC is "24 seconds" which is the maximum thereof. If the real storage priority of the virtual space A is "6", the space reference UIC is "2 seconds"; if the real storage priority of the virtual space B is "3", the space reference UIC of the virtual space B is "8 seconds"; if the real storage priority of the virtual space C is "1", the system reference UIC is "15 seconds"; and if there are only three virtual spaces as above, the system reference UIC is "15 seconds" which is the maximum thereof.

In the example shown in FIG. 7, the OUCBs 241 manage the space maximum UICs which are "12 seconds", "24 seconds" and "15 seconds" for the virtual spaces A, B and C respectively, and the space reference UICs which are "2 seconds", "8 seconds" and "15 seconds" for the virtual spaces A, B and C respectively. On the other hand, the MCT 243 manages the system reference UIC which is "24 seconds" in the illustrated example and the system reference UIC which is "15 seconds" in the illustrated example.

As described before, each of the UICs represents the accumulated value of the elapsed time during which the corresponding real page has not been accessed. Each of the UICs is, as later described, accumulated in accordance with a predetermined update period, and is reset to zero when an access is effected during the time from the last update cycle. Therefore, when the space maximum UIC is large, it means that the condition of use of the real pages of the corresponding virtual space is not so frequent, and if it is small, the condition of use of the real pages of the corresponding virtual space is frequent. When the system maximum UIC is large, this means that the condition of use of the real pages in the system as a whole is not so frequent, and if it is small, the condition of use of the real pages in the system as a whole is frequent.

Thus, the space maximum UICs represent the conditions of use of the corresponding virtual spaces. When the space maximum UICs are used without any modification to evaluate the conditions of use of the virtual spaces respectively; however, weighted evaluations of the respective virtual spaces cannot be effected. Thus, by providing the real storage priorities to the virtual spaces, the space reference UICs are introduced, and even for the virtual spaces having the same space maximum UICs, the space reference UIC of the virtual space having a larger real storage priority has a small value, and by evaluating conditions with this space reference UIC, the real page seems as if it were being frequently accessed.

As later described, when the real pages in the real memory 20 are to be paged out to an external storage unit, the page out operations of the real pages are carried out in the order from the real page having a larger reference UIC, i.e., the UIC determined by dividing the UIC of the real page by the real storage priority. Therefore, in accordance with the space reference UIC obtained by using the real storage priority, the real pages allocated to virtual spaces having larger real storage priorities are preferentially allowed to remain in the real memory 20. As a result, the system reference UIC represents the condition of use of the real memory 20 as a whole when the real storage priorities of the respective virtual spaces are taken into consideration.

The replacement process executing module 52 in the RSM 50 shown in FIG. 3 allocates a real page to a virtual page when a program in the access requesting origin refers to the virtual page and when a real page is not allocated to the virtual page. To execute this process at a high speed, the replacement process executing module 52 manages a queue by maintaining a predetermined number of available real pages as an available frame queue.

Figure 8:
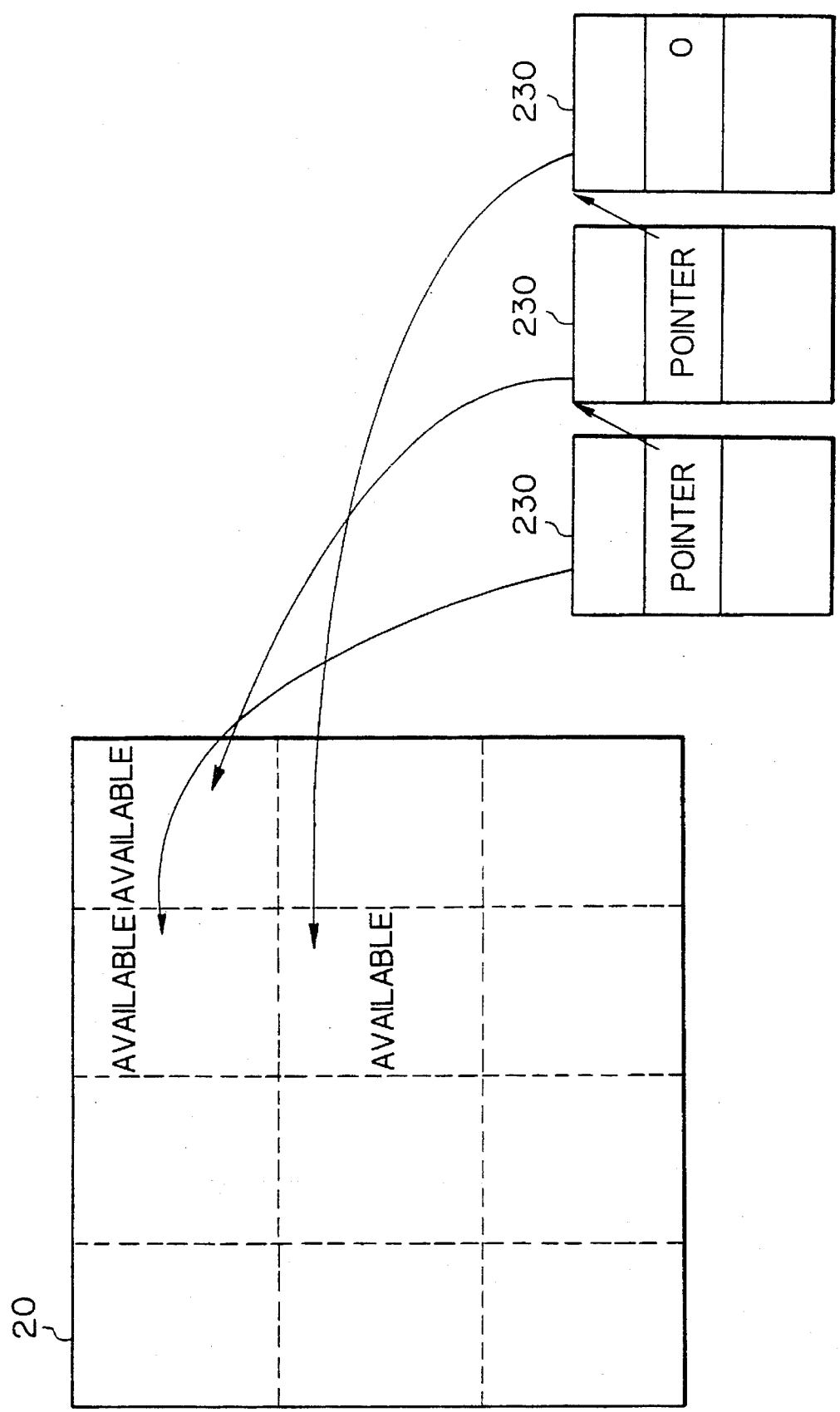
FIG. 8 is a diagram explaining available frame queues in an embodiment of the present invention.

FIG. 8 shows the available frame queue. As shown in FIG. 8, the available frame queue is realized by PFTEs 230 connected by pointers in the PFTEs 230. Namely, an available real page or an available frame is made to correspond to one PFTE 230. In the PFTEs 230 corresponding to the empty real pages, pointers, each indicating the head address of the next PFTE 230, are written so as to form the available frame queue. The pointer in the PFTE 230 in the last entry of the queue is zero, indicating that there is no further real page connected to the available frame queue. An available real page is realized by paging out the memory data of the real page to an external storage, when the UIC of the real page is large. The replacement process executing module 52 executes a page replacement process in such a way that when the number of the real pages connected to the available frame queue is decreased by allocating real pages from the available frame queue, the contents of a real page allocated to another virtual page are paged out so that the real page becomes available and then the empty real page is queued in the available frame queue.

Figure 9:
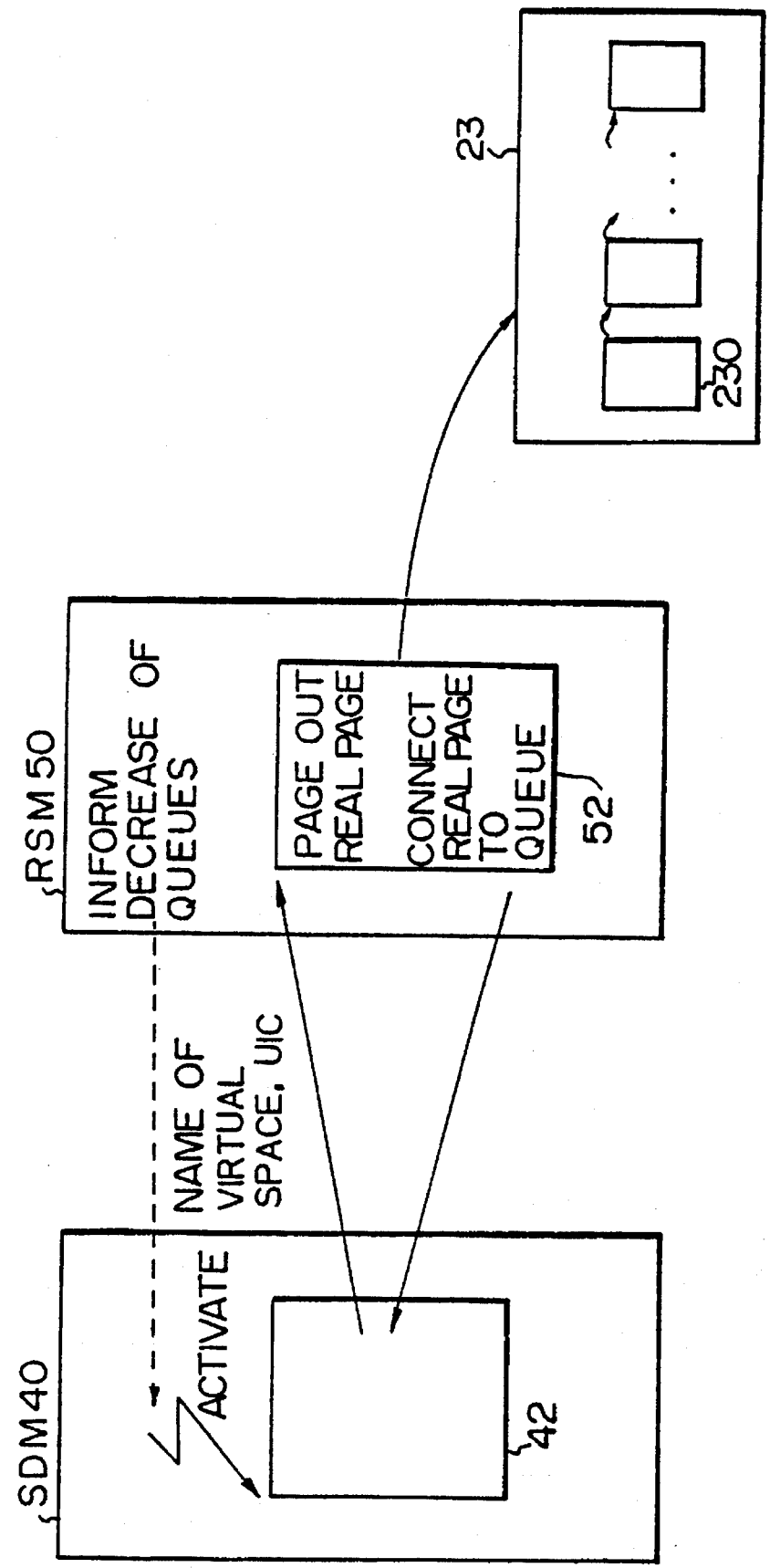
FIG. 9 is a diagram explaining a page replacement process in an embodiment of the present invention.

FIG. 9 shows an execution sequence of the page replacement process. As shown in FIG. 9, when the number of the real pages queued in the available frame queue is decreased to be lower than a predetermined lower limit value, the RSM 50 informs the SDM 40 of that fact. The SDM 40 activates, when it receives this information, the replacement process issuing module 42. The replacement process issuing module 42, when activated as above, first searches each OUCB 241 in the virtual space managing unit 24 to determine one or more virtual spaces having a large space reference UIC, and then by designating the name of one virtual space in the determined virtual spaces and an UIC which is to be an execution reference of the page replacement process (in the beginning, it is the system reference UIC), the replacement process executing module 52 is called. Namely, by designating the name of a virtual space which has a small possibility of being accessed, the replacement process module 52 is called.

The replacement process executing module 52, when it is called as above, first searches the PFTEs 230 in the real memory managing unit 23 to determine a real page having a reference UIC larger than the informed UICs in the real pages allocated to the informed virtual space, and then the determined real page is paged out and is queued in the available frame queue. Control is then returned to the replacement process issuing module 42.

Then, when the control is returned, the replacement process issuing module 42 designates one of the names of the virtual spaces other than the previously determined name and an UIC which is to be an execution reference for the page replacement process, so as to call the replacement process executing module 52. By repeating this process, the number of the real pages queued in the available frame queue increases up to the upper limit value. At this time, if the UIC, which is the execution reference for the designated page replacement process, cannot increase the number of the real pages to the upper limit value, the UIC to be used for the execution reference is gradually decreased resulting in the increase of the number of the real pages to the upper limit value.

Figure 10:
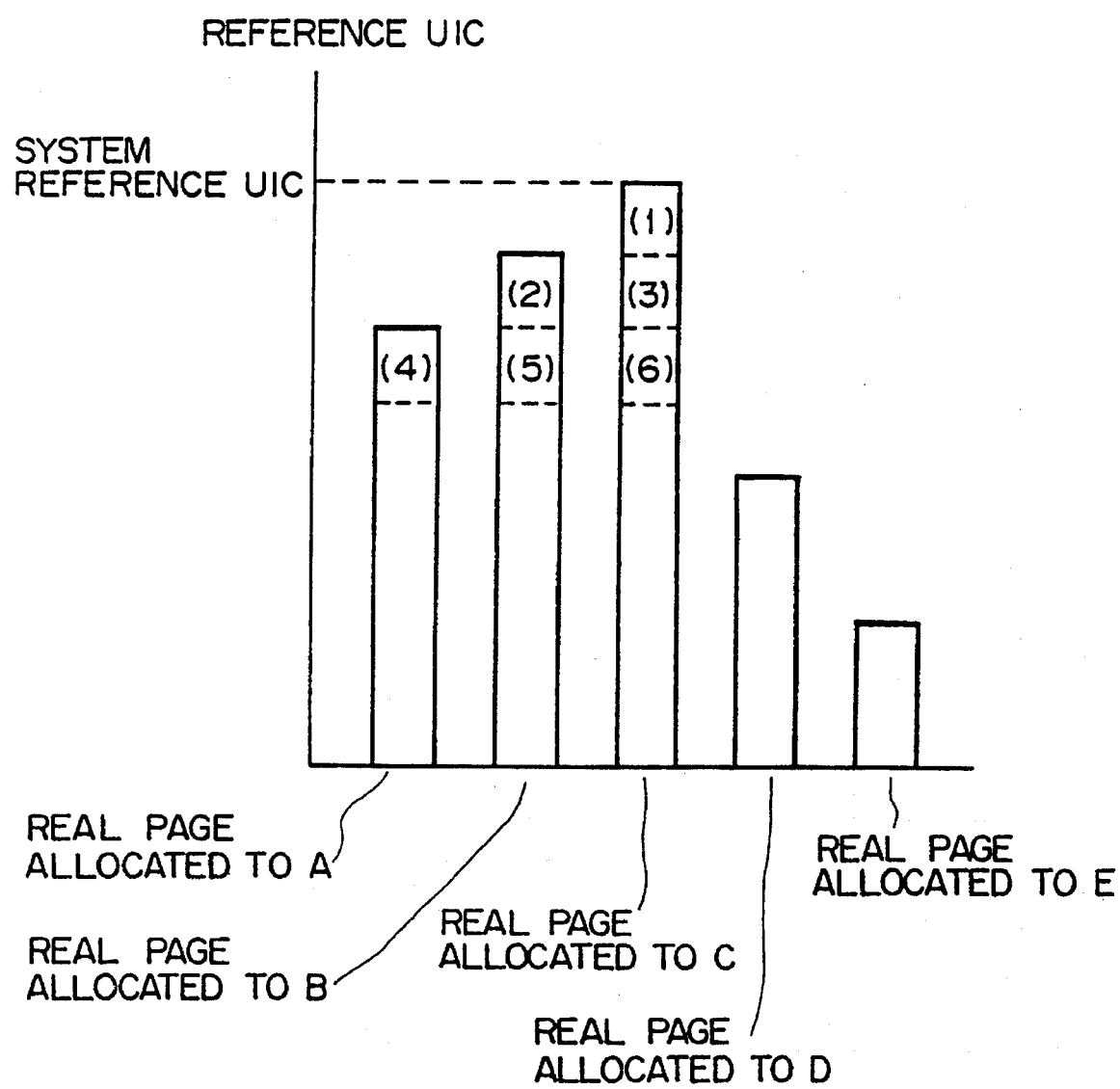
FIG. 10 is a diagram explaining a page replacement process in an embodiment of the present invention.

In this way, the replacement process executing module 52 sequentially pages out the real pages in the order from the larger reference UIC and queues them in the available frame queue, as shown in FIG. 10. In FIG. 10, real pages are paged out in the order from pages 1 to 6. When the process is finished, the replacement process executing module 52 provides the SDM 40 with the information of the real page which is queued. In accordance with the information, the SDM 40 updates the management data such as the system reference UIC in the virtual space managing unit 24.

As will be apparent from the above description of the page replacement process, when the load of the real memory 20 becomes an overload, the supplement of the real pages to the available frame queue by the page replacement process is frequently executed so that the real pages having larger reference UICs are paged out step by step, resulting in the value of the system reference UIC becoming smaller. On the other hand, when the load of the real memory 20 becomes light, the supplement of the real pages to the available frame queue by the page replacement process is not executed so frequently so that the value of the system reference UIC becomes larger. Thus, the system reference UIC represents the condition of use of the real memory 20 as a whole, and represents the load condition of the real memory 20 as a whole.

As described in the following, when a real page is not accessed, the UIC of the real page is sequentially updated in accordance with an UIC update period determined by the interval counter. When it has been accessed since the last update cycle, the UIC of the real page is reset to zero. Thus, the UIC of the real page is counted up by the time of the UIC update period. Accordingly, in order to ensure that the replacement process executing module 52 carries out an accurate page replacement process, namely to accurately queue the real pages having a larger reference UIC in the available frame queue, it is necessary to set a shorter UIC update period. For example, when an UIC update period of one second is used, a reference UIC of 11 seconds and a reference UIC of 19 seconds can be accurately distinguished; but when an UIC update period of 10 seconds is used, these two reference UICs cannot be distinguished.

For the above reason, if the execution of the accurate page replacement process is given preference, the UIC update period must be made short. If so, however, the CPU time needed to executed the UIC update process is increased so that there arises a problem in that the available operation time for the problem programs for executing data processing is shortened. Therefore, according to the present invention, as explained with reference to FIG. 2, when the load of the real memory 20 is light, the page replacement process can be executed accurately even when the UIC of the real page is not updated so frequently. Based on this, the update period of the UIC is determined in accordance with the load of the real memory 20.

Figure 11:
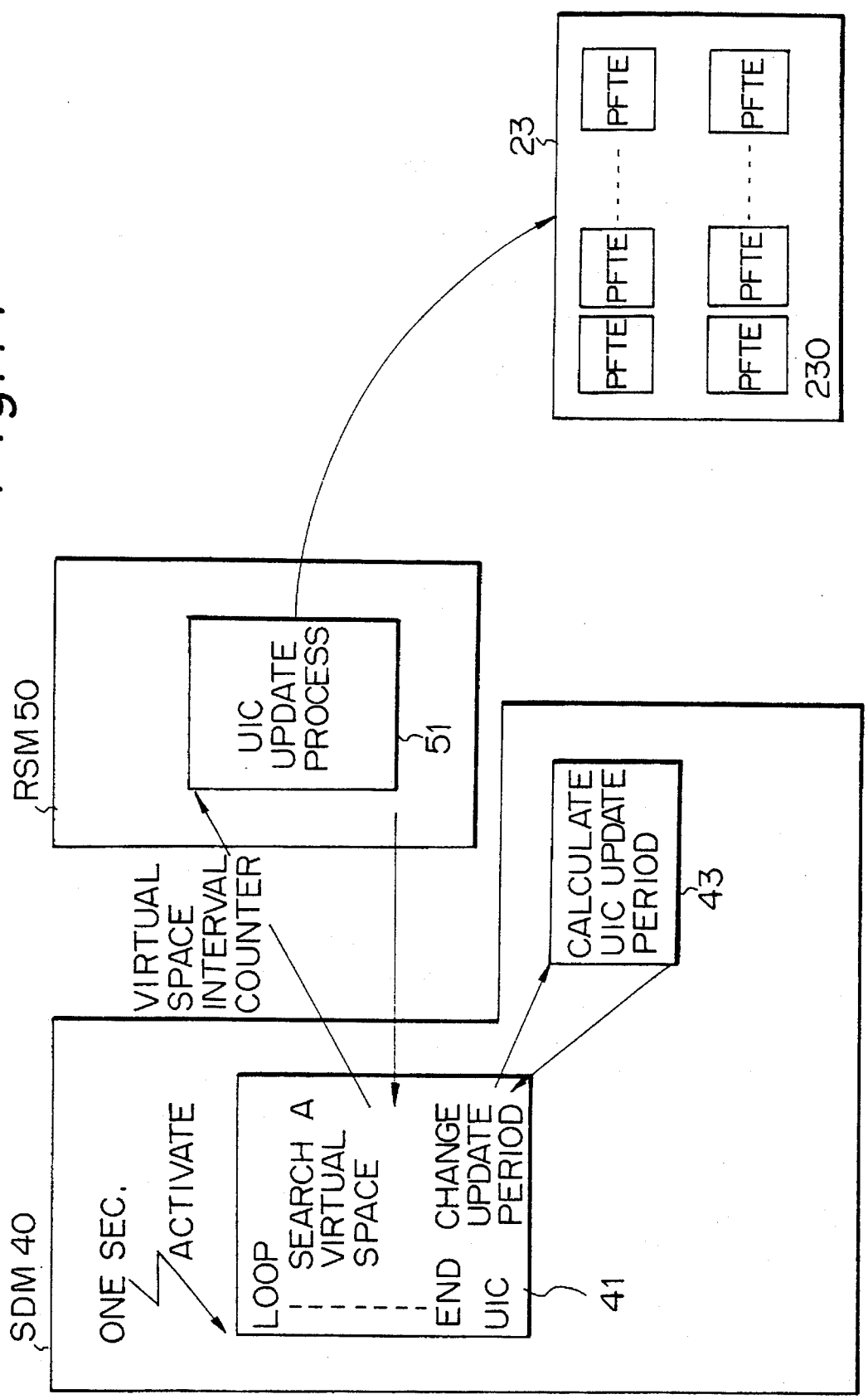
FIG. 11 is a diagram explaining an UIC update period changing process in an embodiment of the present invention.

Next, the update process of the UIC update period of a real page according to an embodiment of the present invention is described in accordance with the processes executed by the UIC update process issuing module 41 and the update period calculating module 43 in the SDM 40 shown in FIG. 3, and the UIC update process executing module 51 in the RSM 50 shown in FIG. 3. FIG. 11 shows the sequence of executing the changing process of the UIC update period.

The SDM 40 activates the UIC update process issuing module 41 at every UIC update process activating period which is set to one second intervals. The UIC update process issuing module 41, when activated as above, first compares the value of the interval counter managed by each OUXB 242 in the virtual space managing unit 24 and the UIC update period previously calculated by the update period calculating module 43 to check whether or not a virtual space having an interval counter value larger than the UIC update period is present. It should be noted that the UIC update period is changed, according to the present invention, in accordance with the condition of use of the real memory 20. If there is a virtual space having an interval counter value larger than the UIC update period, then the UIC update process executing module 51 is called by designating the name of the specified virtual space and the corresponding interval counter value.

The UIC update process executing module 51 thus called as above first searches the PFTEs 230 in the real memory managing unit 23 allocated to the named virtual virtual space to distinguish, of the real pages allocated to the informed virtual space, real pages which are recorded as having been accessed from real pages which are recorded as not having been accessed. Then, the UICs of the real pages which are recorded as having been accessed are reset to zero, and the UICs of the real pages which are recorded as not having been accessed are increased by the informed interval counter value. Then, the control is returned to the UIC update process issuing module 41.

After the control is returned, the UIC update process issuing module 41 checks whether or not there is another virtual space having an interval counter value larger than the UIC update period. If one is present, then the UIC update process executing module 51 is called by designating the name of the specified virtual space and the corresponding interval counter value. By repeating this process, the update of the UIC of all real pages which are not queued in the available frame queue is executed. When the update period of the UIC of the real page of each virtual space is finished, the UIC update process executing module 51 informs the UIC update process issuing module 41 of the space maximum UIC. The UIC update process issuing module 41 receives this information and updates the management data in the OUCB 241 and the MCT 243.

Thus, when the update processes of the UICs of the real pages allocated to all virtual spaces where the interval counter values are larger than the UIC update periods are finished, the UIC update process issuing module 41 then calls the update period calculating module 43. The thus called update period calculating module 43 first searches the MCT 243 in the virtual space managing unit 24 to obtain the system reference UIC, and then, by using this system reference UIC, a new UIC update period to be compared with the interval counter value at the next UIC update process activating period is calculated in accordance with the following expression. Namely, a new UIC update period is calculated in accordance with the expression:

UIC update period=system reference UIC×required accuracy. Here, the required or requested accuracy in the above expression means the accuracy required or requested for a UIC of a real page. For example, when the system reference UIC is 100 seconds, and when the accuracy of 10% is required for the UIC of each real page, the UIC update period is determined as 10 seconds (=100 seconds×0.1) in accordance with the above expression.

As described above, the system reference UIC represents an indication of the load condition of the real memory 20 as a whole. The system reference UIC is small when the load of the real memory 20 is large, and is large when the load of the real memory 20 is small. Thus, when the load of the real memory 20 is large, the UIC of each real page is updated in accordance with a short period; and when the load of the real memory 20 is small, the UIC of each real page is updated in accordance with a long period. Even by this method, an accurate page replacement process can be executed. From this view point, by updating the UIC of a real page in accordance with a long period, the amount of the CPU resources used for the UIC update process is decreased, and the loss of CPU resources due to serialization of processes in the UIC update processes in a multiprocessor system can be prevented.

Figure 12:
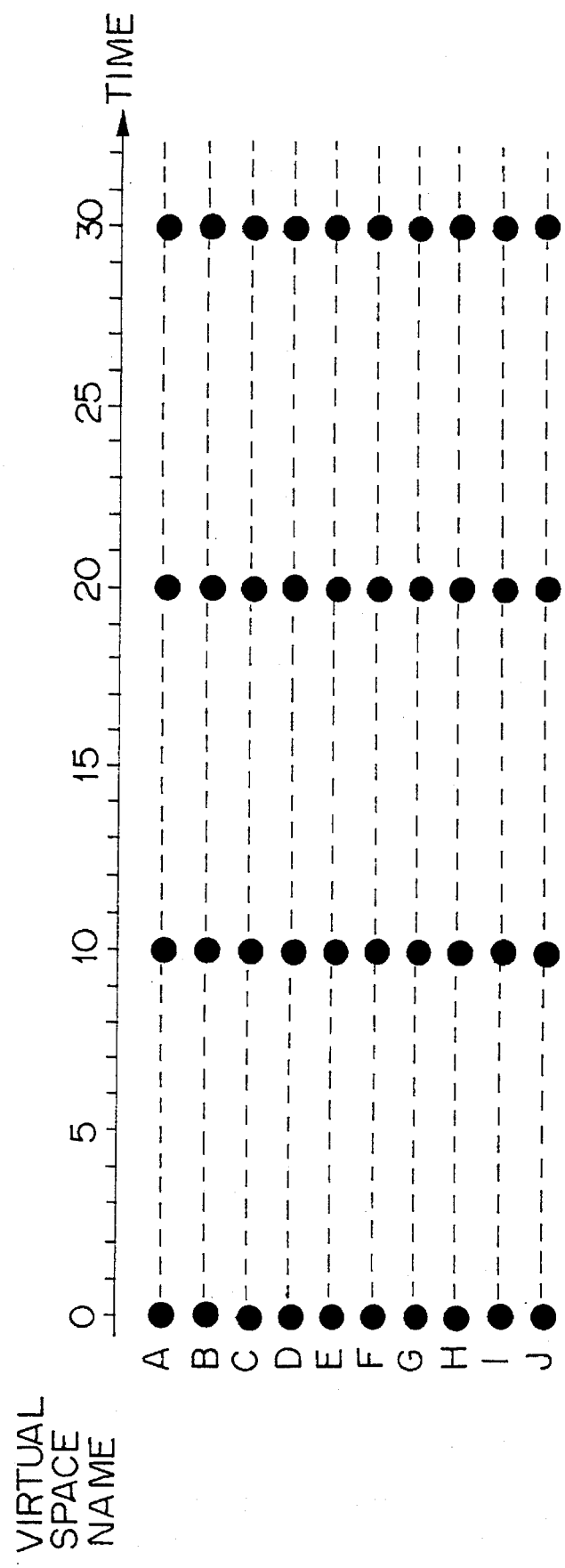
FIG. 12 is a diagram explaining UIC update processes for respective virtual spaces according to an embodiment of the present invention.

Namely, conventionally, at each time of the UIC update activating period which is set to be one second, the UIC of the real page of each virtual space having a large interval counter value is updated. By contrast, in the present invention, as shown in FIG. 12, when the system reference UIC is 100 seconds, and when the required accuracy is 10%, the UIC of the real page of each virtual space having a large interval counter value is updated at the time of each UIC update period of 10 seconds calculated by the update period calculating module 43. Therefore, the consumption of the CPU resources needed to execute the updating process of the UIC can be greatly decreased and the loss of CPU resources due to the serialization of the UIC updating process in a multiprocessor system can be largely prevented.

Figure 13:
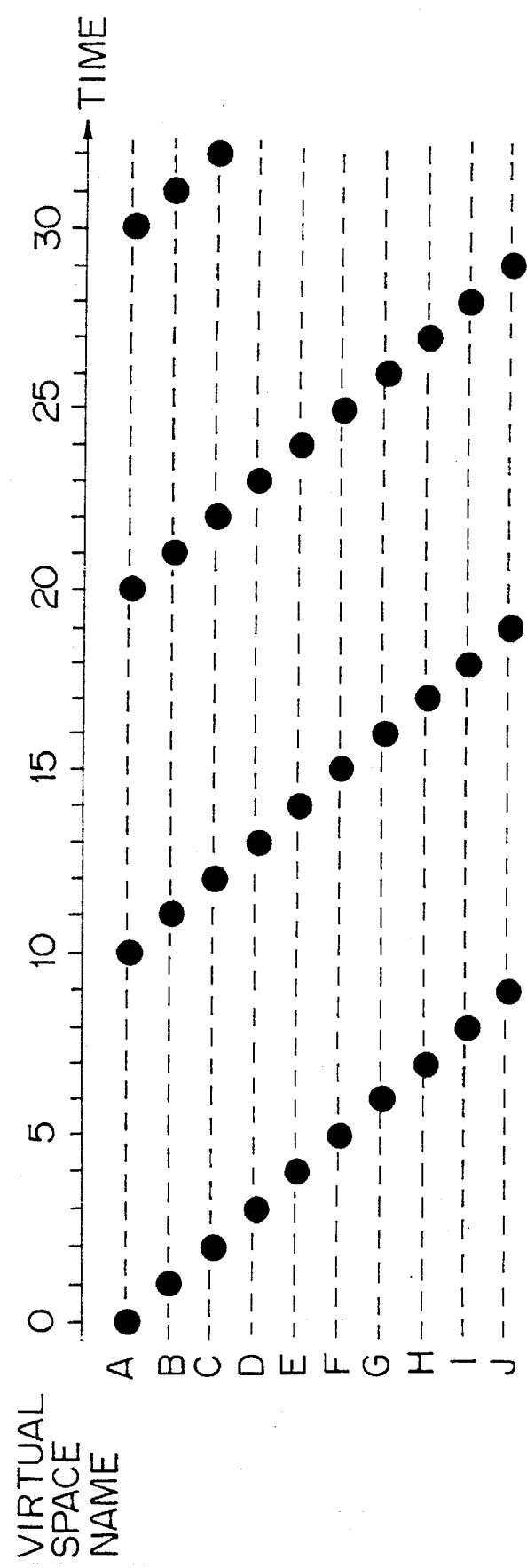
FIG. 13 is a diagram explaining UIC update processes for respective virtual spaces according to another embodiment of the present invention.

To further increase the above effects of the present invention, the UIC update process issuing module 41 in the SDM 40 does not execute the update processes of the UICs of the real pages at one time in each of the UIC update periods calculated by the update period calculating module 43, but executes the processes, as shown in FIG. 13, distributed within the UIC update period.

Namely, referring to FIGS. 12 and 13, assume that:

the amount of the real pages allocated to a virtual space A=Na, the amount of the real pages allocated to a virtual space B=Nb, the amount of real pages allocated to a virtual space C=Nc, the amount of the real pages allocated to a virtual space J=Nj, and the total number of the real pages which are not queued in the available frame queue is N (=Na+Nb+. . . +Nj). The UIC update process activating period calculated by the update period calculating module 43 is one second. According to this embodiment of the present invention, within each of the UIC update process activating periods, the UIC update processes of the following upper limited number of real pages are executed:

upper limited page number=N/UIC update period. Namely, the upper limited page number is an average page number at each UIC update process activating period of one second.

This UIC update process is executed in such a way that the UIC update process issuing module 41 is activated by the SDM 40 at each UIC update process activating period which is set to one second intervals. The UIC update process issuing module 41 thus activated then designates the virtual space name and the interval counter value to call the UIC update process executing module 51. In response to the call, the UIC update process executing module 51 executes the UIC update processing of the real pages allocated to the virtual space informed from the UIC update process issuing module 41. Then, the UIC update process executing module 51 informs the UIC update process issuing module 41 of the number of the real pages processed by the UIC update process executing module 51. The UIC update process issuing module 41 accumulates the real page numbers informed from the UIC update process executing module 51. If the accumulated value does not exceed the upper limit of page numbers, the UIC update process issuing module 41 continues to designate the next virtual space name and the interval counter value to call the UIC update process executing module 51 to repeat the above process until the number of accumulated real pages exceeds the upper limit of page numbers. When the number of accumulated real pages reaches the upper limit of page numbers, the UIC update process in the UIC update process process activating period of one second, a similar process is repeated for the other virtual spaces which has not been processed in the previous UIC update process activating period.

By executing the UIC update process, as will be apparent by comparing FIG. 12 and FIG. 13, the concentrated use of the CPU for UIC updating can be prevented.

The UIC update period obtained from the update period calculating module 43 is calculated at each UIC update process activating period which is set to be one second intervals. By this construction, however, the UIC update period may occasionally experience a large change from, for example, four seconds to eight seconds. If such a change occurs, according to the above-mentioned UIC update process, there is a disadvantage in that, when the UIC update period is four seconds, the UIC of the real page is updated at ¼ of that time, whereas when the UIC update period is changed to eight seconds, the next update process activating period is changed to ⅛ of that time.

Therefore, according to still another embodiment of the present invention, the UIC update process issuing module 41 does not directly use the UIC update period calculated by the update period calculating module 43 but, to explain by using the above example, executes the UIC update by using the UIC update period of four seconds; after completion thereof, then executes the UIC update by using the UIC update period of five seconds; after completion thereof, then executes the UIC update by using the UIC update period of six seconds; and after completion thereof, then executes the UIC update by using the UIC period of seven seconds; and after completion thereof, then executes the UIC update by using the UIC period of eight seconds.

By executing this UIC update process, the generation of a disadvantageous UIC update processing result due to a rapid change in the UIC update period can be prevented.

The present invention is not restricted to the embodiments described above. For example, the present invention has been described for the embodiments applied to the UIC update processes of real pages, however, the present invention may be applied to other devices to be managed by the computer system. The devices to be managed may be an input/output unit, a system storage unit, and so forth.

As described above, according to the present invention, in a computer system, when a device to be managed is managed, the management can be realized with a reduced CPU time. In addition, in realizing the management, the concentration of the CPU use can be prevented and a disadvantageous management process result due to a rapid change in the management period can be prevented.

I claim:

1. A device management system in a computer system for managing devices of the computer system, each device of the devices having a corresponding load condition indicated by a value, said device management system comprising:

a load measuring unit for measuring the value of the corresponding load condition of a selected device of the devices;

a management period determining unit for determining, in accordance with the value of the corresponding load condition measured by said load measuring unit, a management period such that the larger the value of the corresponding load condition, the shorter the management period, and the smaller the value of the corresponding load condition, the longer the management period; and a managing unit for executing a processing check of the corresponding load condition of the selected device, said processing check being executed periodically in accordance with the management period determined by said management period determining unit, said management period being determined independently of any one demand for the selected device.

2. A device management system in a computer system as claimed in claim 1, wherein:

the selected device has a plurality of mechanisms, and the managing unit comprises execution dispersing means for managing a dispersing timing of the execution of the processing check with respect to each of the mechanism within said management period determined by said management period determining unit.

3. A device management system in a computer system as claimed in claim 2, wherein the managing unit further comprises management period changing means for sequentially changing said management period determined by said management period determining unit so as to provide provisional management periods, each said provisional management period changing from a management period in a last management cycle to a management period in a current management cycle on a step by step basis.

4. A device management system in a computer system as claimed in claim 1, wherein said device to be managed is a real memory for storing a plurality of real pages.

5. A device management system in a computer system as claimed in claim 4, wherein said device management system is a memory management system for updating an unreferenced interval count (UIC) of each real page in the real memory, and said management period determining unit determines a UIC update period according to a maximum value of UICs.

6. A device management system in a computer system as claimed in claim 5, wherein said UICs are space reference UICs obtained for a plurality of virtual spaces, each space reference UIC for each corresponding virtual space of the plurality of virtual spaces being obtained by dividing a space maximum UIC of a corresponding virtual space by a real storage priority given to the corresponding virtual space.

7. A device management system in a computer system as claimed in claim 6, wherein said UIC update period is determined by multiplying a system reference UIC by a preselected value, said system reference UIC indicating a system load condition.

8. A device management system in a computer system as claimed in claim 5, wherein:

said management period determining unit comprises updating means for calculating a number of update processings to be executed based on said UIC update period determined.

9. A device management system in a computer system as claimed in claim 8, wherein the updating means further comprises update period changing means for sequentially changing said UIC update period determined so as to provide a provisional update period, said provisional update period changing from a UIC update period in a last update cycle to a UIC update period in a current update cycle, step by step.

* * * * *